Figure 1:
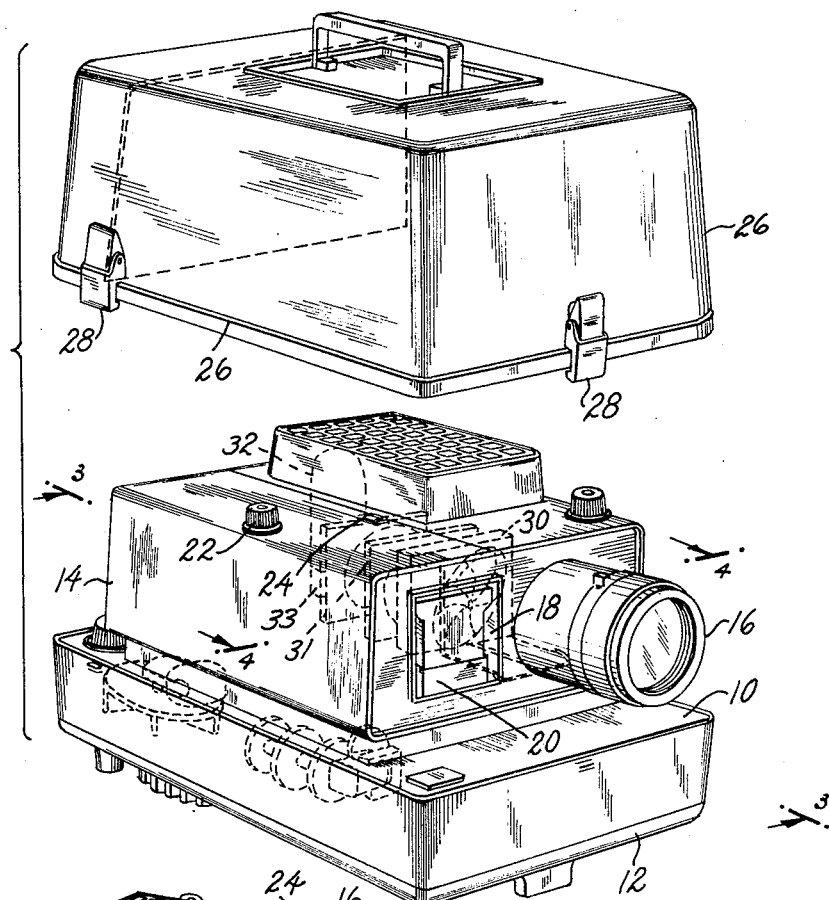

Dec. 11, 1962   W B. PESTER   3,067,650
PROJECTOR
Filed Nov. 25, 1959   8 Sheets-Sheet 1

INVENTOR.
W BRUCE PESTER
BY
ATTORNEY

Dec. 11, 1962  W B. PESTER  3,067,650
PROJECTOR
Filed Nov. 25, 1959  8 Sheets-Sheet 3

INVENTOR.
W. BRUCE PESTER
BY
ATTORNEY

Dec. 11, 1962 W B. PESTER 3,067,650
PROJECTOR
Filed Nov. 25, 1959 8 Sheets-Sheet 4

INVENTOR.
W. BRUCE PESTER
BY
ATTORNEY

Dec. 11, 1962 W B. PESTER 3,067,650
PROJECTOR
Filed Nov. 25, 1959 8 Sheets-Sheet 6

INVENTOR.
W BRUCE PESTER
BY
ATTORNEY

Dec. 11, 1962 W B. PESTER 3,067,650
PROJECTOR
Filed Nov. 25, 1959 8 Sheets-Sheet 7

INVENTOR.
W. BRUCE PESTER
BY
ATTORNEY

Dec. 11, 1962

W B. PESTER 3,067,650

PROJECTOR

Filed Nov. 25, 1959

8 Sheets-Sheet 8

INVENTOR.
W. BRUCE PESTER

BY

ATTORNEY

United States Patent Office 3,067,650
Patented Dec. 11, 1962

3,067,650
PROJECTOR
W Bruce Pester, Ypsilanti, Mich., assignor, by mesne assignments to Argus Incorporated, a corporation of Delaware
Filed Nov. 25, 1959, Ser. No. 855,383
6 Claims. (Cl. 88—28)

The present invention relates to optical projectors and, more particularly, to projectors for slide transparencies which are adapted to receive magazines containing a number of slides in a predetermined arrangement and to project such transparencies in sequence.

Most slide transparency projectors, of this general type, with which I am familiar, either have no arrangement for blanking out the light falling on the screen during periods when there is no slide transparency in the projection gate, or when such shutter mechanisms are provided, they have proven to be complicated in construction and unreliable in operation.

Furthermore, such projectors do not generally have any simple and reliable way of adapting the projector for the projection of single slides not carried in a slide magazine or for blanking the light beam from the viewing screen during intervals when a slide is being manually inserted or removed from the projection gate.

An object, therefore, of the present invention is the provision, in a slide projector as aforesaid, of a simple, reliable mechanism which will enable the operator to either show a number of slides from a slide magazine in a preselected order or, alternatively, to project slides one at a time without the use of the slide magazine or even to insert a single slide and project it upon the viewing screen without removing the magazine from the projector.

It is a further object of the present invention to provide mechanism in such a slide projector to positively blank out the light beam during all periods of time when there is no slide actually in the projector gate, whether single slides or slides from the magazine are being projected.

It is still a further object of the present invention to provide a slide projetcor which is capable of selective operation, either with a slide magazine or single slides, without requiring a complex change-over procedure on the part of the operator.

A still further object of the present invention is the simplification of the operator's task in operating a slide projector mechanism as aforesaid.

The foregoing objects, and others which may appear from the following detailed description, are attained in accordance with the principles of the present invention, by providing a slide projector having the conventional light source, condensing lenses, projection gate and projector lens, with a pair of shutter blades in the optical train, preferably between the slide gate and the projector lens, such shutter blades being normally biased in a closed position so as to cut off the light beam. Power operated means are provided for sequentially removing slides one at a time from a slide magazine and inserting them in the projection gate. A coupling is provided between the slide moving mechanism and the shutter blades, which normally tends to open the shutter blades at the end of each stroke of the slide transferring structure. The shutter moving mechanism is provided with a yielding abutment which is readily movable by the slide moving mechanism if there is no slide fed into the projection gate. However, the presence of a slide in the projector gate blocks the movement of the yieldable abutment and causes the shutter operated mechanism to positively open the shutter blades where they are maintained for as long as the slide remains in the projection gate.

The present invention also contemplates means for feeding single slides into the projection gate from the side opposite that in which the magazine-held slides are fed. The same sensing mechanism which blocks movement of the movable abutment in the presence of magazine-fed slides in the gate is arranged to be moved in the opposite direction by the hand insertion of the single slide to thereby positively move the shutter blades to an open position.

Figure 2:
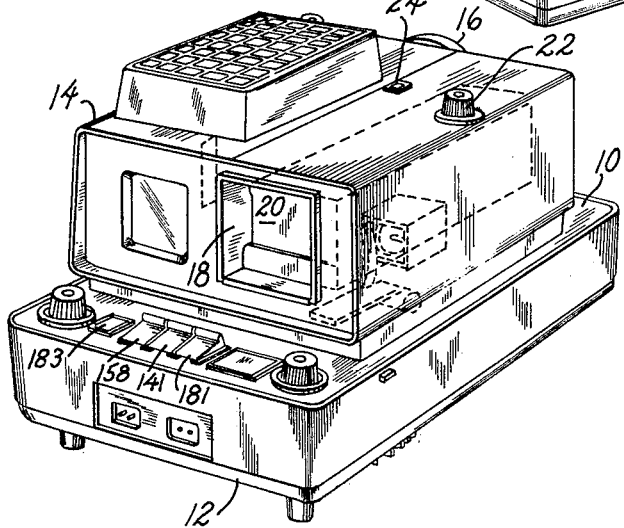
Figure 3:
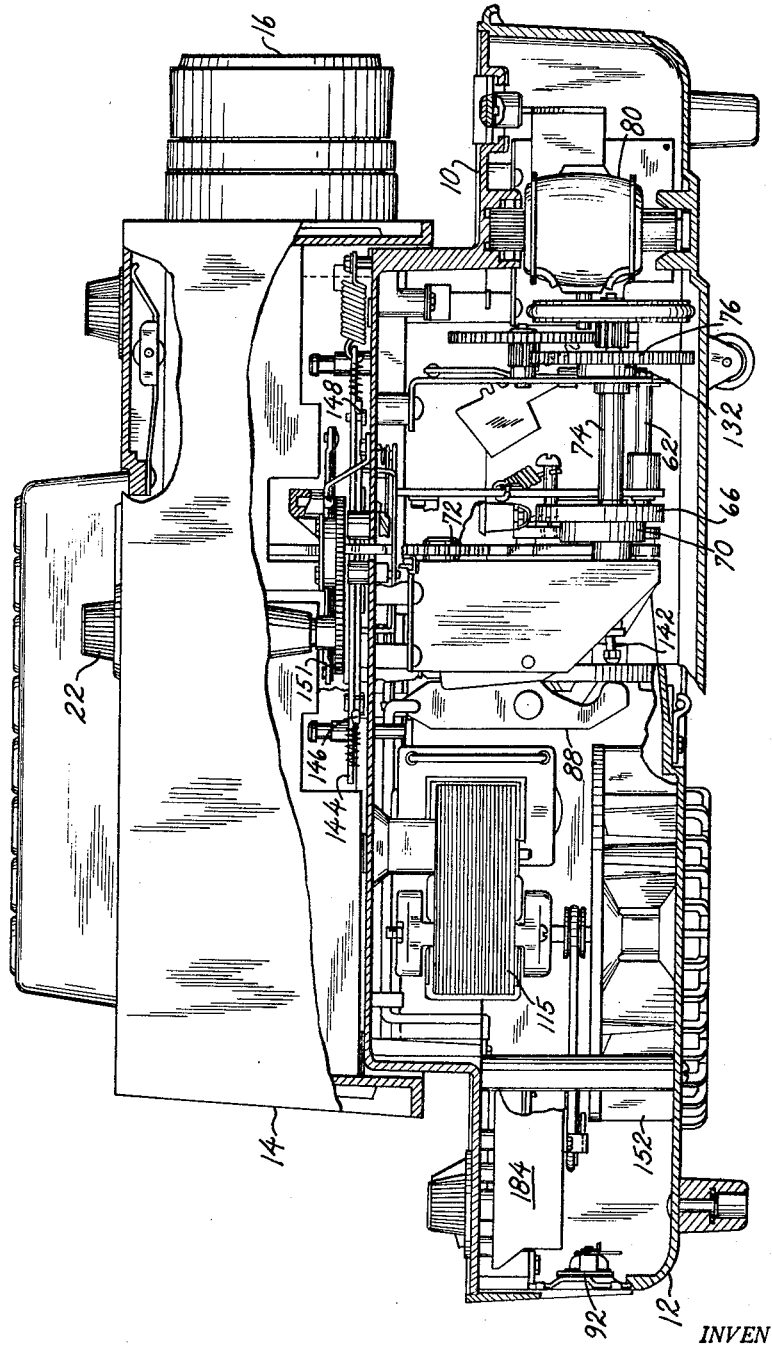
Figure 4:
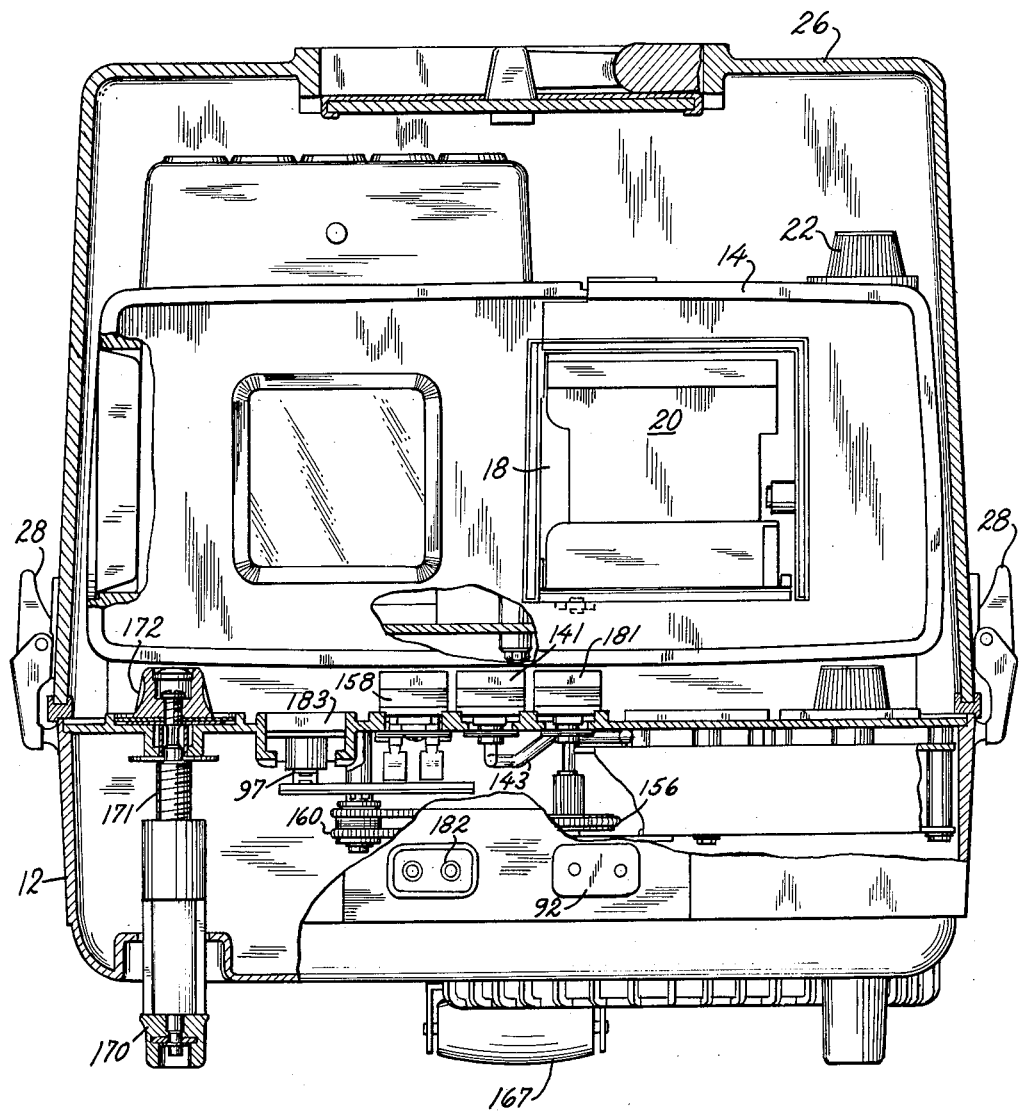
Figure 5:
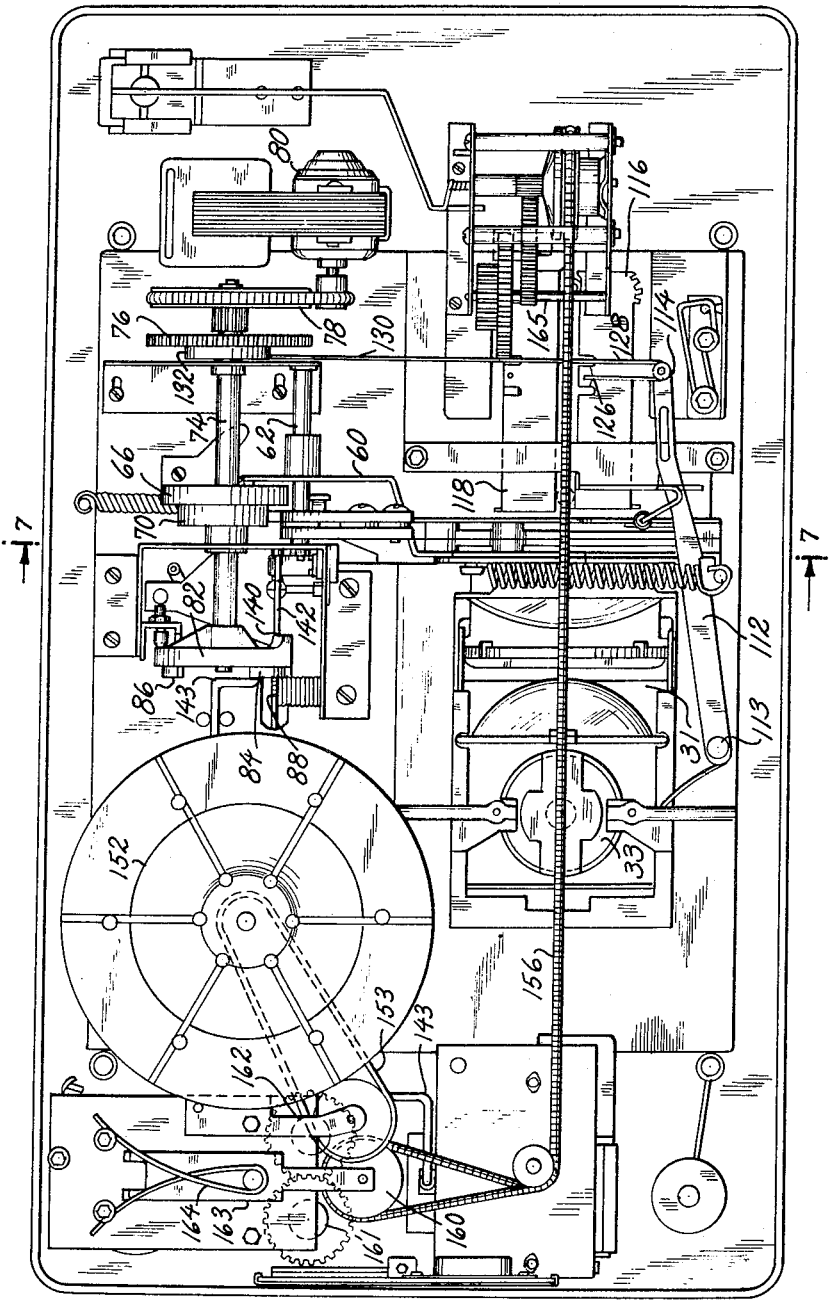
Figure 6:
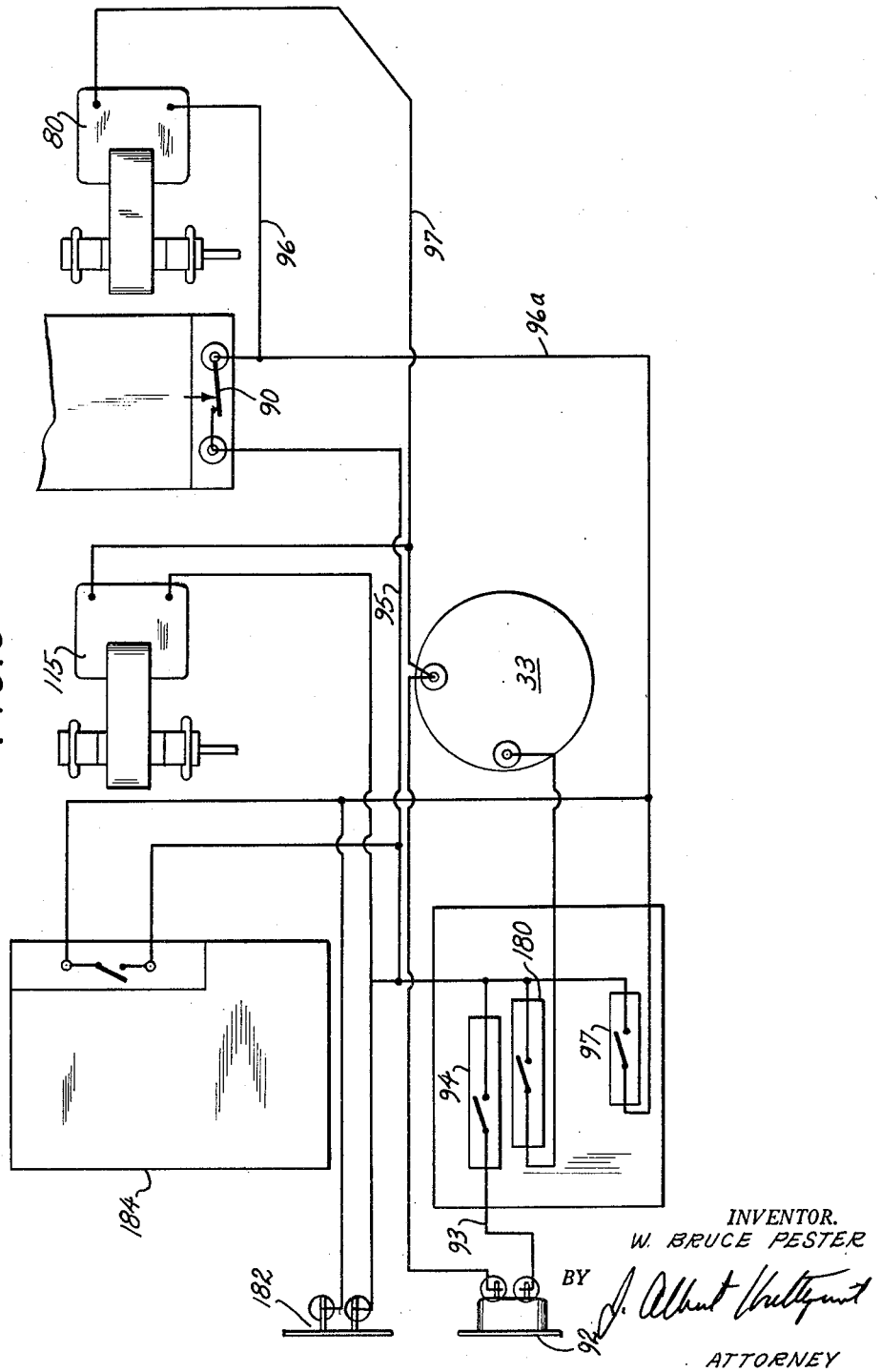
Figure 7:
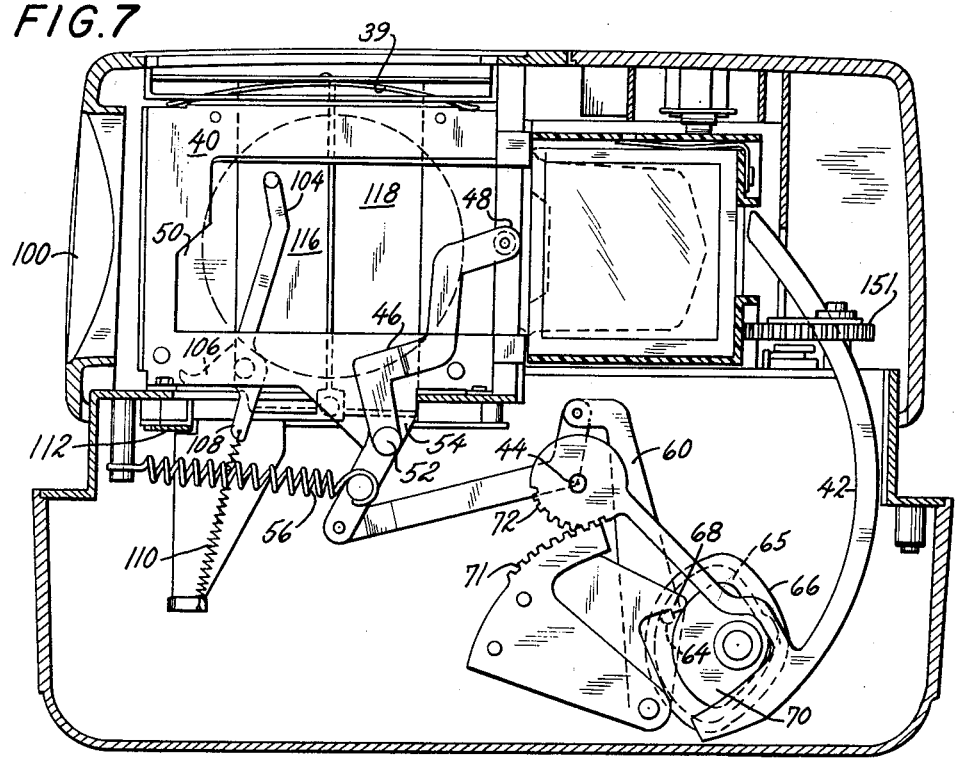
Figure 10:
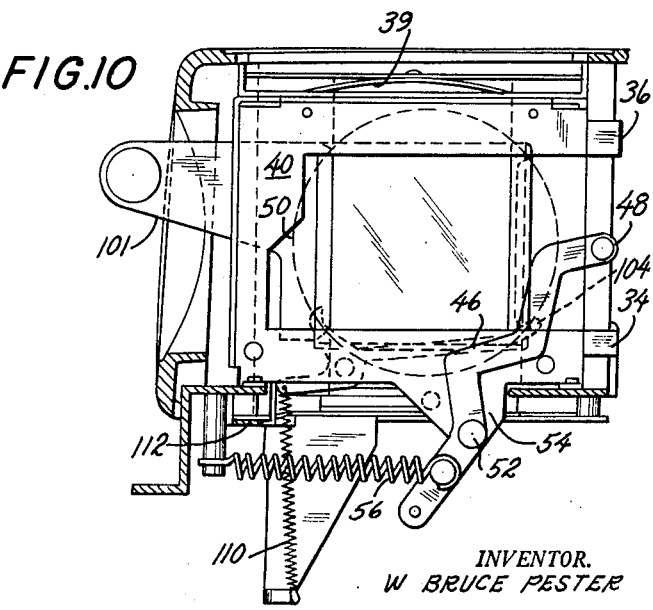
Figure 8:
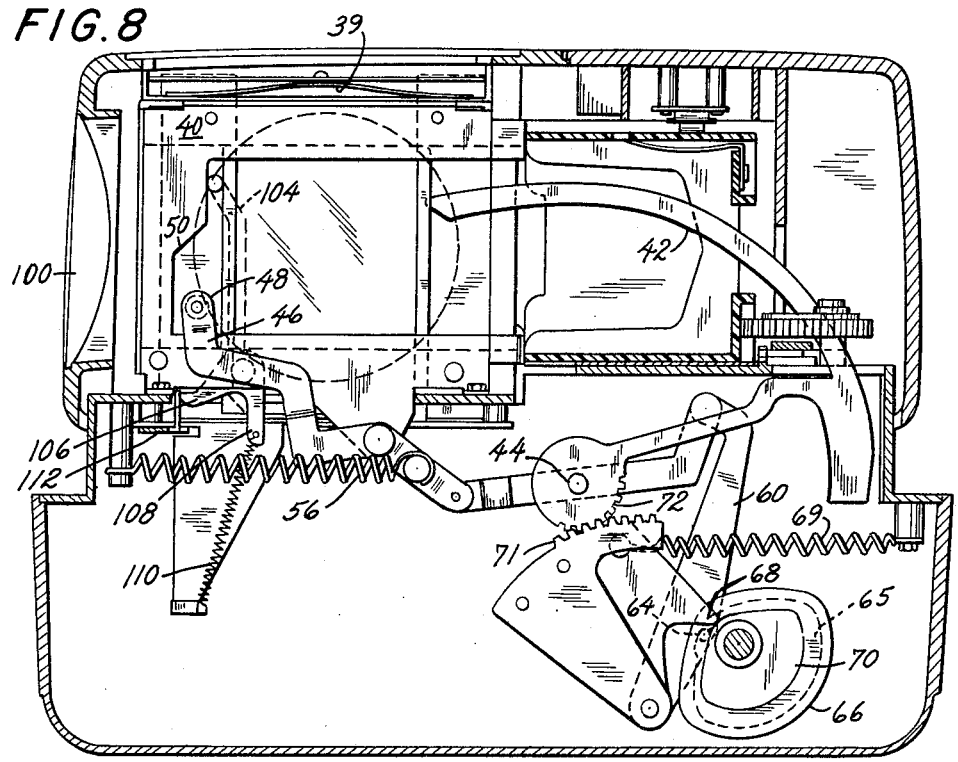
Figure 9:
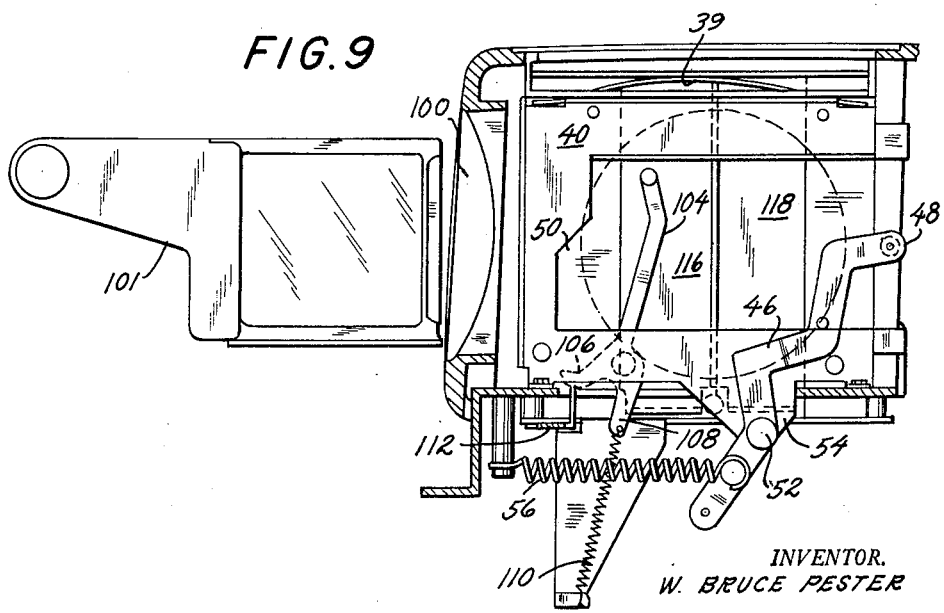
Figure 11:
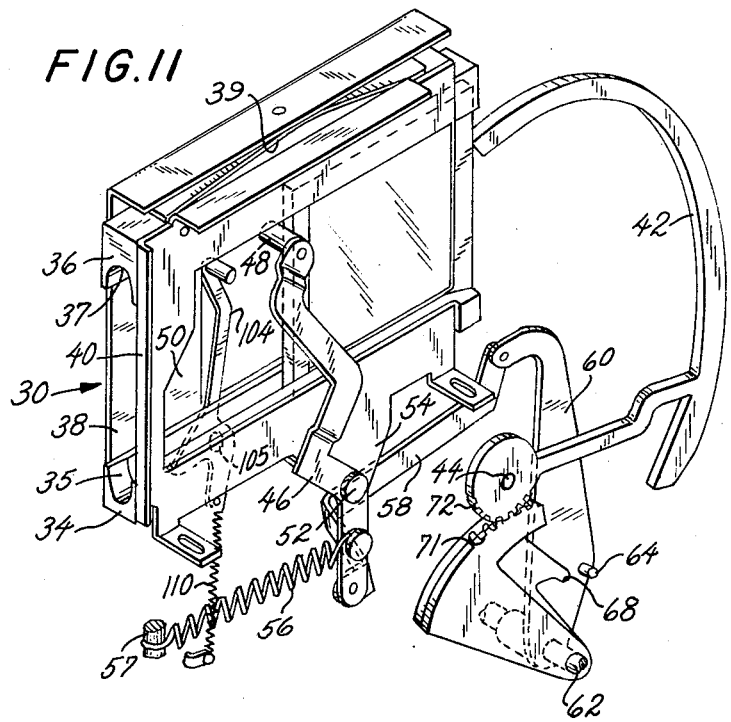
Figure 12:
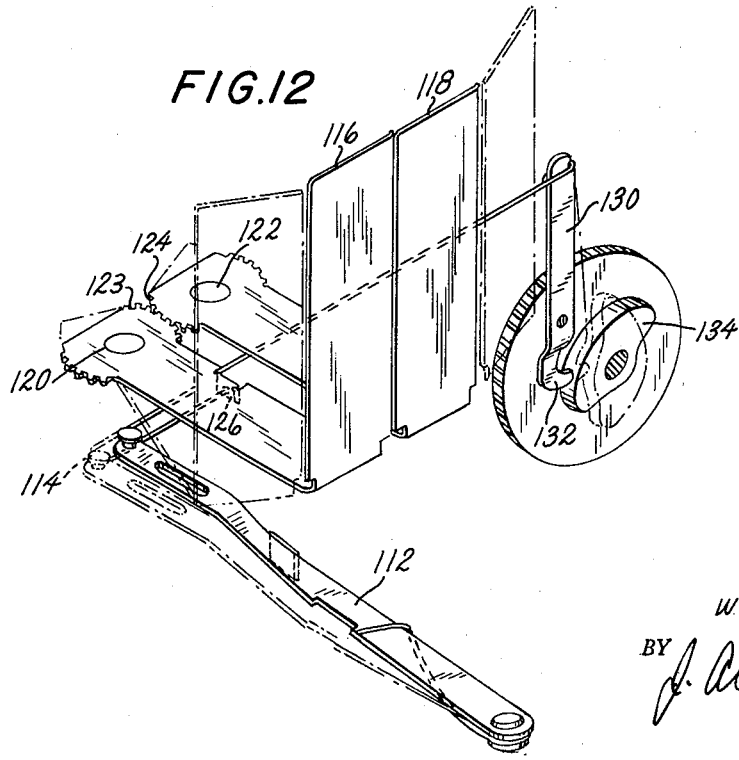

The present invention will be more fully understood by reference to the following detailed description, which is accompanied by a drawing in which FIGURE 1 illustrates in perspective view a slide projector, embodying the principles of the present invention, with the storage cover partially lifted; FIGURE 2 illustrates in perspective view, a rear right quarter view of the projector with the storage cover entirely removed; FIGURE 3 is a right hand elevational view, partly in section, in order to show some of the details of the operating mechanism of the projector; FIGURE 4 is a rear elevation view of the projector with the storage case and the portions of the lower case in section; FIGURE 5 is a bottom view with the bottom case removed; FIGURE 6 is a circuit diagram showing schematically the electrical connections within the projector; FIGURE 7 is a transverse cross-section taken along 7—7 in FIGURE 5 showing the slide feeding and slide sensing members in an at-rest position; FIGURE 8 is a transverse section similar to FIGURE 7 but showing the slide feeding and slide sensing mechanism in the position assumed with a slide in the projection gate; FIGURE 9 is a fragmentary cross-section similar to FIGURE 8 but showing the projector in a condition to receive a manually inserted slide; FIGURE 10 is a sectional view similar to FIGURE 9 but showing the manually inserted slide in position; FIGURE 11 is a fragmentary perspective view of the projection gate of the projector during the cycle of operation of automatic insertion of a slide into the projection gate, and FIGURE 12 is a fragmentary perspective view of the shutter mechanism illustrating the operation of the movable abutment which disables the operation of opening the slides in the absence of a slide in the projection gate.

The perspective views in FIGURES 1 and 2 illustrate the general organization of a slide projector according to one embodiment of the present invention. The projector includes a foundation plate 10 resting within, and secured to, a bottom cover 12 within which is housed most of the operating mechanism of the projector. The projector also includes an upper housing 14 divided generally into two major sections, one section of which contains the projection lamp, the projection gate, the shutter mechanism and projector lens 16. The other half comprises a tunnel 18 adapted to receive a slide magazine or tray 20. It also houses the mechanism for feeding the slide tray or magazine forward or backwards in a step-by-step manner so as to sequentially present one slide after the other to an operating position opposite the projection gate. Gearing is also provided within this section of the housing and connected to knob 22 for a manual operation of the magazine or tray forward or backward as desired. Preferably, the slide tray or magazine 20 is provided with a sequential series of numbers along one longitudinal top edge in alignment with viewing window 24 to provide instantaneous reference as to which slide in the tray is in a position to be fed into the projection gate, or is in said gate.

FIGURE 1 also shows storage case 26 which is adapted to fit down over the upper portion 14 of the projector in contact with the upper edges of base cover 12 and to be secured thereto by latches 28 when the projector is to be stored away between sessions of use.

Immediately back of projector lens 16 is a projection gate 30 (shown in dotted lines in FIGURE 1, and in more detail in FIGURES 7 to 11, inclusive), while back of film gate 30 is the condenser lens assembly 31 (FIGURE 5) and the projection lamp 32 carried in socket 33 (FIGURE 5). The projection gate includes a lower slide guide rail 34 having a longitudinal slide guiding groove 35 on its upper surface and a similar upper guide rail 36 (FIGURE 11), carried between front and back apertured guide plates 38 and 40, respectively. Upper guide rail 36 has a downwardly facing guide 37. Guide rail 36 is mounted for limited vertical displacement between guide plates 38 and 40 in order to take care of slight variations in the vertical dimension of slides inserted into projection gate 30. Guide rail 36 is lightly pressed downwardly by leaf-spring 39.

Slides are inserted into projection gate 30 from slide magazine 20 by injector finger 42 journaled on bearing 44 whereas the slide is removed from the projection gate by ejector lever 46 having an operating finger 48 playing within the aperture in plate 40. Finger 48 is received in recess 50 (FIGURE 11), when the slide is inserted into the projection gate to its proper position for projection. Ejector lever 46 is pivoted in stud 52, secured to bracket 54, depending from the lower edge of rear plate 40. The driving force for ejecting the slide from the projection gate is provided by a tension spring 56 having one end secured to lever 46 below its bearing on stud 52 and the other end secured to a convenient, fixed mounting post 57. The ejector finger 48 is caused to operate in appropriately phased opposing-time relationship to the operation of injector finger 42 by driving link 58, coupled to operating lever 60, pivotally mounted for separate rotation on shaft 62. Lever 60 also carries a cam-follower pin 64 which plays in an internal 65 cam track in the face of cam 66, while the motion of injector finger 42 is derived from cam-follower 68 riding on the peripheral surface of cam 70, coaxial with and rigidly secured to cam 66 in a predetermined phase relationship. Spring 69 assures that cam follower 68 always remains in contact with cam 70 and provides the driving force for ejecting a slide from the projection gate. Thus, if a slide should jam in the gate the force applied to it is limited by the tension of spring 69 so that it will not be crushed or broken. Cam-follower 68 has a toothed sector 71 meshing with a gear segment 72, concentric with the pivot 44 of injector finger 42 and rigidly secured to the injector finger 42. Cams 70 and 66 are carried by cam shaft 74 (FIGURE 5), coupled at its forward end through gear train 76 and belt drive 78 to electrically powered changer motor 80. Cam shaft 74 also carries at its rear end a cycle cam 82 having on its rear face a broad cam surface 84 and diametrically opposed thereto a narrow face 86. Cam-follower 88 is arranged to open normally closed switch 90 (FIGS. 5 and 6), whenever cam-follower 88 rides on either cam surfaces 84 or 86. The electrical circuit for changer motor 80 is shown in FIGURE 6 and proceeds from the power input socket 92 by way of lead 93, to main switch 94, lead 95, to normally closed switch 90, lead 96, to one terminal of the changer motor 80, thence from motor 80 by way of lead 97 back to the other terminal of the input socket 92. A connection also goes by way of lead 96a from lead 96, through a momentary contact switch 97, back to lead 95. Thus, if switch 97 is momentarily closed the effect of the opened switch 90 is over-ridden and changer motor begins to run. As soon as cam-follower 88 rides off cam face 84, switch 90 closes and continues the operation of the motor until switch 90 is again opened by cam-follower 88 riding up on either cam face 84 or 86. Cam-follower 88 is arranged to be selectively laterally reciprocated to an inner, an intermediate and an outer position radially with respect to cam 82. In its central position it will engage in sequence both cam faces 84 and 86. Thus, changer motor 80 will be driven at each actuation of switch 97 only far enough to provide a half rotation of cam shaft 14. In either of the extreme radial positions of cam-follower 88 it will miss the narrow cam face 86 and be engaged only by cam face 84 and the changer motor will be energized for a complete revolution of cam shaft 74. When cam shaft 74 is energized for a complete revolution one complete cycle of operation of injector finger 42 and ejector finger 48 is accomplished. When the cam-follower 88 is so positioned as to strike cam face 86 during the rotation of cam shaft 74, the cam shaft stops with cam 86 under the cam-follower 88, and with the injector and ejector fingers in the position shown in FIGURE 7. This clears the slide magazine tunnel 18 of any barriers and allows the slide magazine to be inserted or removed. It also conditions the projector to receive single slides carried in a single slide carrier 101 and inserted through slide receiving aperture 100 (FIGS. 4 and 7).

The projection gate 30 is also provided with a slide sensing finger 104, pivoted at 105 and adapted to be moved to the left as shown in FIGURE 8 by a slide inserted from the magazine. The lower end of sensing finger 104 is bifurcated into a stop member 106 and a cam lever 108. Cam lever 108 also carries one end of a light tension spring 110 to normally hold the sensing finger in an intermediate position within the aperture in the projection gate as shown in FIGURE 9. The presence of an automatically inserted slide in the projection gate, as shown in FIGURE 8, causes stop finger 106 of the slide sensing finger 104 to move into a position where it will block lateral reciprocation of shutter lever 112 (most clearly shown in FIGS. 5 and 12). The shutter lever is pivoted to the base plate 10 at pivot 113 and at its forward end carries a pulley 114.

The projector incorporates a pair of shutter blades 116 and 118 arranged in the closed position to shut off the light from lamp 33 through the projector lens 16. The shutter blades are journaled on pivots 120 and 122, respectively, and are geared together for simultaneous equal and opposite motion by gear sectors 123, 124. Shutter blade 116 carries a downwardly extending tab 126 to which is secured cord 128. Cord 128 passes around pulley 114 on shutter lever 112 and thence to shutter operating lever 130, (FIGS. 5 and 12), bearing a cam-follower 132 which cooperates with cam 134, carried on cam shaft 74. Thus, as cam shaft 74 rotates, shutter operating lever 130 is reciprocated to pull on cord 128. However, if there is no slide in the projection gate, shutter lever 112 is free to reciprocate and it is pulled laterally to one side and the shutters 116 and 118 are not opened. However, the presence of a slide automatically inserted in the projection gate causes slide sensing finger 104 to be operated into a position such that stop finger 106 moves into the path of lateral movement of shutter lever 112 and prevents it from moving. The pull on cord 128 by lever 130 then causes the shutter blades to open and the shutter remains open as long as the slide is in the projection gate. This condition is illustrated in FIGURE 8.

When a slide is manually inserted, as shown in FIGURES 9 and 10, in a single slide carrier 101 the slide sensing finger 104 is operated to its extreme right hand position (FIG. 10). The cam finger 108 of the sensing finger 104 rides against shutter lever 112 and operates it downwardly in FIGURE 5. Since cam 134 is, in this mode of operation, stationary, lever 130 cannot be moved by the tension on cord 128 and the motion of shutter lever 112 pulls shutter blades 116 and 118 open and maintains them in said position for as long as the slide remains in the projection gate. Of course, for manual operation, as well as for removal of the slide carriage, cam follower 88 is set in its intermediate position so that cam shaft 74 stops in its intermediate position, with follower 88 on narrow cam face 86. This causes the ejector and injector levers 42, 46 to remain in the position shown in FIGURE 7. Otherwise, insertion of the single slide through aperture 100 would be blocked by ejector finger 46.

The intermittent step-by-step motion of slide tray 20 is accomplished by a front cam face 140 on cam 82 (FIG. 5), which actuates cam-follower 142 in a quick stroke at the time when ejector finger is in the position of rest shown in FIGURE 7. Cam-follower 142 actuates a longitudinally sliding index bar 144 (FIG. 3). Index bar 44 carries pawls 146 and 148 which engage teeth on the slide tray during its reciprocation to move the slide tray 20 forward or backward in measured increments, depending upon which of the pawls 146, 148 is selected for operation. The selection of pawls 146, 148 and the swinging of cam follower 88 is connected by control button 141 (FIG. 2) acting through push rod 143 (FIG. 5).

The details of the slide tray indexing mechanism will not be discussed in detail in this application, but more complete details may be had by reference to application Serial No. 12,588, entitled "Projectors," filed March 3, 1960, by Edwin A. Waggoner, and assigned to the assignee of the present invention.

Knob 22 (FIGS. 1 and 2) is connected at its interior end to gearing 151 (FIG. 3) adapted to engage the rack teeth on magazine 20 for manual indexing of the magazine, and for easy insertion and removal of the magazine from the projector, when the slide feeding mechanism is in its position of rest, as shown in FIGURE 7.

The drawing, particularly FIGURES 1, 2, 3 and 5 also show mechanism for power elevation of the front end of the projector. Motor 115, which is provided primarily to drive cooling fan 152, also drives, by means of belt 153, a tumbler gear mechanism arranged to selectively drive belt 156 in a forward or reverse direction, depending upon whether elevator button 158 (FIG. 1) is operated forward or backward so that pulley 160 engages either rubber wheel 161 or 162 of the tumbler gear mechanism. Pulley 160 is carried by swinging carriage 163, normally spring biased to a neutral central position by spring 164.

Belt 156, when driven, rotates the gears of gear train 165 in one direction or the other to cause elevator foot 167 to approach toward, or recede from bottom casing 12. As it presses against a table on which the projector is set, it, of course, causes the front end of the projector to rise.

One rear foot 170 is threaded onto a threaded shaft 171 carried by knob 172. By appropriate adjustment of the protrusion of foot 170 from the bottom cover 12 of the projector, a degree of tilt can be set into the projector to compensate for side-to-side slope of a table on which it may be placed.

For a more complete understanding of this structure, reference may be had to my application entitled "Projector," Serial No. 855,370, filed concurrently herewith, and assigned to the assignee of the present application.

Referring back again to FIGURE 6, fan motor 115 is directly controlled by switch 94, while lamp socket 33 is controlled by switch 180 connected from lead 95 to the said lamp socket. Thus, lamp 32 cannot be turned on without motor 115 running to supply cooling air, but cycle motor 80 and fan motor 115 can be operated so that the control of elevation and feeding of slides can be accomplished without the light being on.

A supplemental socket 182 is provided, connected across switch 97 whereby a remote control switch can be plugged in and the cycling of the changer controlled from a remote point.

A timing device 184 is provided, having a normally open switch connected across switch 97, to automatically initiate (if desired) at controlled intervals, closure of the circuit to the change motor 80 for automatically showing slides in the magazine 20. Details of the timer, per se, are conventional and are not further disclosed since they do not form a part of the present invention. Switches 94 and 180 are operated by switch button 181 (FIG. 2) and switch 97 is operated by press plate 183.

I claim:

1. In a slide projector including a lamp, a projection gate, a projector lens along an optical axis, means for moving a slide magazine carrying a number of slides along a path parallel to said axis, an injector arm adapted to be driven through said magazine to insert a slide in said gate, an ejector arm movable across said gate to return said slide to said magazine, a motor for operating said arms in predetermined time relationship, a normally closed shutter along said axis, means operated by said motor acting to open said shutter in response to motion of said arms, sensing means in said gate responsive to actual presence of a slide in said gate for conditioning said shutter operating means to action, said shutter operating means being otherwise inoperative, and means for manually inserting single slides in said gate, said sensing means being operated by motion of a manually inserted slide into said gate to operate said shutter to an open position.

2. In a slide projector including a lamp, a projection gate, a projector lens along an optical axis, means for moving a slide magazine carrying a number of slides along a path parallel to said axis, an injector arm adapted to be driven through said magazine to insert a slide in said gate, an ejector arm movable across said gate to return said slide to said magazine, a motor for operating said arms in predetermined time relationship, a normally closed shutter along said axis, means operated by said motor acting to open said shutter in response to motion of said arms and sensing means in said gate for conditioning said shutter operating means to action, said shutter operating means being otherwise inoperative, and means for manually inserting single slides in said gate, said sensing means being independently operable by motion of a manually inserted slide into said gate to operate said shutter to an open position.

3. In a slide projector including a lamp, a projection gate, a projector lens along an optical axis, and means for automatically inserting slides from a magazine into said gate from one side and ejecting said slides from the same side of said gate into said magazine, a shutter interposed in said axis for normally interrupting a light beam along said axis in the absence of a slide in said gate, means responsive to said inserting means for opening said shutter, further means for manually inserting slides into said gate from the opposite side of said gate, and means responsive to said manual insertion for opening said shutter.

4. In a slide projector including a lamp, a projection gate, a projector lens along an optical axis and means for automatically inserting slides from a magazine into said gate from one side and ejecting said slides from the same side of said gate into said magazine, a shutter interposed in said axis for normally interrupting a light beam along said axis in the presence of a slide in said gate, and means for accepting single slides manually inserted from the other side of said gate and means responsive to the insertion of a slide into said gate from either side for opening said shutter.

5. In a slide projector including a lamp, a projection gate, a projector lens along an optical axis, means for moving a slide magazine carrying a number of slides along a path parallel to said axis, an injector arm adapted to be driven through said magazine to insert a slide in said gate, an ejector arm movable across said gate to return said slide to said magazine, a motor for operating said arms in predetermined time relationship, a normally closed shutter in said axis, a cam follower arm, a cam operated by said motor, said cam follower arm being coupled to said shutter and operating to tend to open said shutter in response to rotation of said cam, the coupling between said follower arm and said shutter including a cord connected to said arm and said shutter and passing over a pulley mounted on an arm spring biased to hold said cord taut, a sensing lever having one end in said gate and movable by a slide being inserted into said gate so that the other end of said lever blocks motion of said arm carrying said pulley whereby motion of said cam operates said shutter.

6. In a slide projector including a lamp, a projection gate, a projector lens along an optical axis, means for moving a slide magazine carrying a number of slides along a path parallel to said axis, an injector arm adapted to be driven through said magazine to insert a slide in said gate, an ejector arm movable across said gate to return said slide to said magazine, a motor for operating said arms in predetermined time relationship, a normally closed shutter in said axis, a cam follower arm, a cam operated by said motor said cam follower arm being coupled to said shutter and operating to tend to open said shutter in response to rotation of said cam, and means for manually inserting single slides in said gate, the coupling between said follower arm and said shutter including a cord connected to said arm and said shutter and passing over a pulley mounted on an arm spring biased to hold said cord taut, a sensing lever having one end in said gate and movable by a slide being inverted into said gate so that the other end of said lever blocks motion of said arm carrying said pulley whereby motion of said cam operates said shutter, said sensing lever also being operable by motion of a manually inserted slide into said gate to operate said shutter to an open position.

References Cited in the file of this patent

UNITED STATES PATENTS

| | | |
|---|---|---|
| 1,161,660 | Guerzoni et al. | Nov. 23, 1915 |
| 2,286,322 | Warriner | June 16, 1942 |
| 2,878,604 | Mulch | Mar. 24, 1959 |
| 2,978,823 | Wiklund | Apr. 11, 1961 |

FOREIGN PATENTS

| | | |
|---|---|---|
| 216,363 | Australia | Sept. 20, 1956 |